Nov. 3, 1970     H. F. HOBBS     3,537,260
TORQUE CONVERTERS

Filed Dec. 20, 1968     9 Sheets-Sheet 1

Howard Frederick Hobbs
by

Nov. 3, 1970  H. F. HOBBS  3,537,260
TORQUE CONVERTERS

Filed Dec. 20, 1968  9 Sheets-Sheet 7

Nov. 3, 1970   H. F. HOBBS   3,537,260
TORQUE CONVERTERS
Filed Dec. 20, 1968   9 Sheets-Sheet 9

United States Patent Office 3,537,260
Patented Nov. 3, 1970

3,537,260
TORQUE CONVERTERS
Howard Frederick Hobbs, Rose Cottage, Pillory Green, Napton, Rugby, Warwickshire, England
Filed Dec. 20, 1968, Ser. No. 785,673
Claims priority, application Great Britain, Jan. 1, 1968, 57/68
Int. Cl. F16d 33/00
U.S. Cl. 60—54                         12 Claims

ABSTRACT OF THE DISCLOSURE

A hydro-kinetic torque converter-coupling having an impeller driven by an input shaft, a bladed element adjacent the impeller exit, a gearing connecting the bladed element to the impeller and a turbine which is impelled by liquid from the bladed element and which drives an output shaft.

This invention relates to hydro-kinetic torque converter-couplings.

A three element torque converter-coupling comprises an impeller, a turbine and a reactor. The reactor placed between the turbine exit and the impeller inlet is mounted on a free wheel so that when there is no reaction torque, it may idle and the device act as a two element coupling. During operation there is a circulation flow of a mass of liquid outwards through the impeller blades, inwards through the turbine blades and axially (largely) through the reactor blades.

Torque on the elements is due to a difference in the tangential velocity of the circulating mass of liquid at exit to that at entry.

The losses in a device of this kind mostly result from the flow of the circulating liquid because of shock on entering the blades and friction in flowing through the blades. The friction losses, and in some circumstances also the shock losses vary as the third power in the speed of the flow and therefore increase rapidly with increase in circulation.

In the case of the rotating impeller, the tangential velocity at exit may be largely due to the speed of rotation and a considerable torque may result even though the circulating mass of liquid be small and losses small.

The reactor element is however stationary when there is reaction torque and the tangential velocity at exit, which produces the torque is wholly dependent upon the speed of the flow of the circulating liquid and the angle of the blades. It is not therefore practicable to obtain substantial torque without substantial flow and substantial losses.

In any torque converting device, the output torque is equal to the input torque together with the reaction torque.

This difference in input (impeller torque) and output (turbine torque) is also brought about by the tangential velocity at the reactor exit. This is also the velocity at the impeller entrance and the greater this is, the greater the tangential velocity at the impeller exit and the greater the turbine torque. This power circulation which must accompany torque conversion is likewise therefore wholly dependent upon the circulatory flow and cannot be substantial without substantial loss.

The present invention embraces a new principle which enables power circulation and torque reaction to be obtained which is not wholly dependent upon the circulatory flow of liquid.

It employs a rotating bladed element associated with the rotating impeller element and torque thereon, i.e., difference in tangential velocity at entry and exit can be varied with variation in rotary speed without necessarily having variation in circulatory flow.

The torque thereon is also capable of being varied without change in rotary speed or in circulating flow.

An object of the invention is to provide much improved efficiencies and another object is the provision of ability to vary at will the speed characteristics and the power being transmitted.

According to the invention a hydro-kinetic torque converter-coupling includes a bladed element adjacent the impeller element exit and geared to the impeller element so as to apply driving torque thereon.

The gearing may comprise a planetary gear train having three members, the third member having a connection to a stationary part of the apparatus.

The blades of the element, hereinafter termed the circulatory or secondary turbine, may be pivoted and the angles varied during operation.

The apparatus will comprise an impeller, the circulatory turbine and an output turbine but may also include additional elements such as a reactor. The angles of the blades of the reactor may be of variable angles. There may be two or more turbines. There may be more than one circulatory turbine.

The invention will be further described by way of example with reference to the accompanying diagrammatic drawings wherein.

Figure 1:
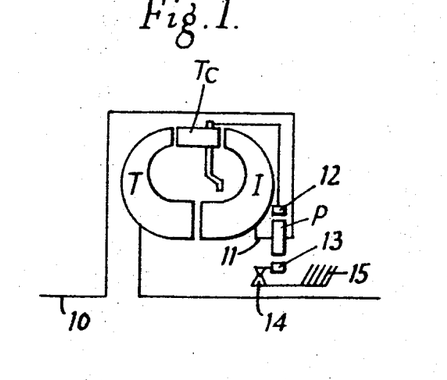
FIGS. 1, 2 and 3 show the principal components of three forms of converter-couplings made in accordance with the invention.

In FIG. 1, there is an impeller I, an output driving turbine T and a secondary or circulatory turbine Tc. An input shaft 10 drives a pinion carrier 11 of a toothed planetary gearing which has pinions driving a ring gear 12. The ring gear 12 is driven by the turbine Tc and the carrier 11 is operatively connected with the impeller I. A sunwheel 13 reacts through a freewheel device 14 on to a stationary part 15.

Thus the liquid from the impeller I drives the secondary turbine Tc and the latter transmits power back to the impeller I through the gear 12. The secondary turbine Tc and the output turbine T are both driven by the liquid to which energy is imparted by the impeller I.

Figure 2:
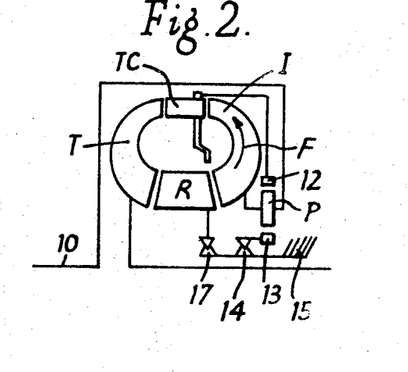

FIG. 2 shows the addition of a reactor R also reacting through a freewheel device 17 with the stationary part 15. F shows the direction of liquid flow in the impeller.

Figure 3:
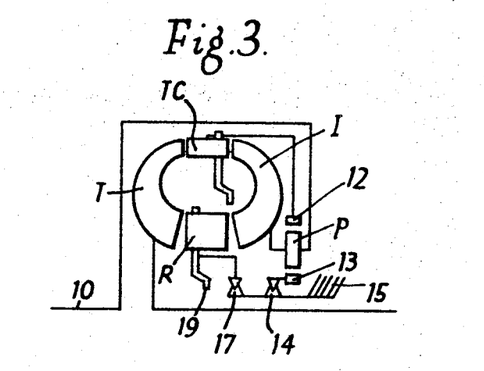

FIG. 3 shows a reactor having variable blade angles. The angle may vary with the load thereon and the blade cranks 19 may be connected with a piston supported by a spring and damped by trapped liquid.

Figure 4:
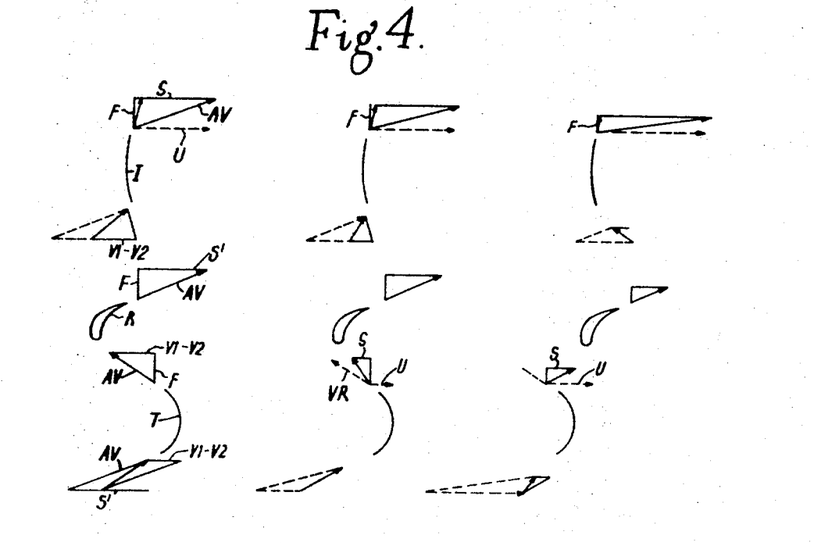
FIG. 4 are liquid flow diagrams of a known three element converter-coupling.

FIG. 4 illustrates the flow in a normal three element converter. I is an impeller blade; R is a reactor blade; and T is a turbine blade. V1–V2 represents the instantaneous change of velocity known as "shock loss." The circulatory or torus flow F the linear velocity U of the blades at exit and the tangential velocity (component of absolute velocity) S are indicated. AV is the absolute velocity of liquid leaving the blades; VR is speed of liquid relative to the blade.

The torque on each element of a converter is:

$$T = M(RS - R'S')$$

M is the mass flow,
R radius at exit and
R' radius at entrance
S is the tangential component of the absolute velocity at exit and
S' is the tangential component of the velocity at entrance of liquid.

The left-hand diagram shows the stalling condition. The centre diagram shows 0.5 ratio and the right-hand diagram shows 0.85 ratio.

It can be seen that the reactor torque is dependent on F and the impeller torque considerably influenced by U.

Figure 5:
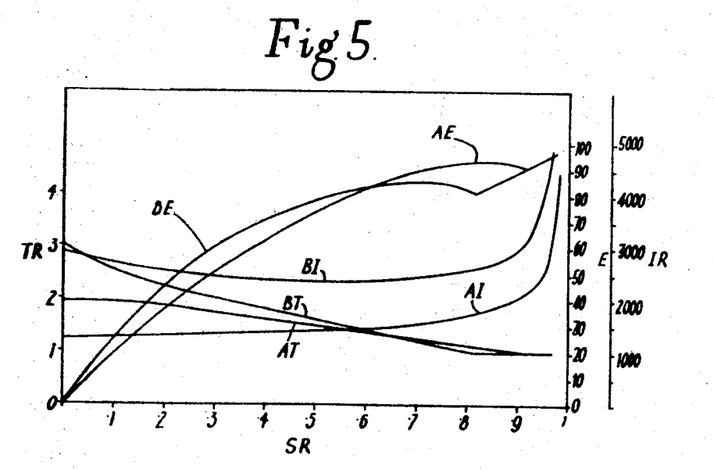
FIG. 5 shows torque and efficiency curves of such known converter-couplings.

One advantage of the present invention is that a large forward angle at impeller exit can be used. FIG. 5 shows the advantages normally obtained with blades of this kind in respect to increased converter capacity and improved efficiency at the higher speed end of the range. In FIG. 5, 0–4 is torque ratio, 0 to 1 is speed ratio; 0 to 100 is efficiency percent; 0 to 5000 is input r.p.m. The A curves relate to a converter-coupling A having impeller exit angle of 60°. The B curves relate to a converter-coupling B having impeller exit angle of 145°. AE, BE represent efficiency. AT, BT represent torque ratio. AI, BI represent input r.p.m. These advantages are retained, but could not previously be fully utilised owing to the poor efficiency at the lower speed end and reduced torque multiplication at stall.

The well known three element converter-coupling is usually combined with stepped gearing because the torque range is insufficient and speed characteristics are such that only a portion of the input engine power can be used during torque conversion.

Input r.p.m. can be varied by variation of the angle of the reactor blades but as these are normally of fine angle at exit there is largely scope only for variation to increased angle. This tends to make the speed characteristics still worse.

Figure 9:
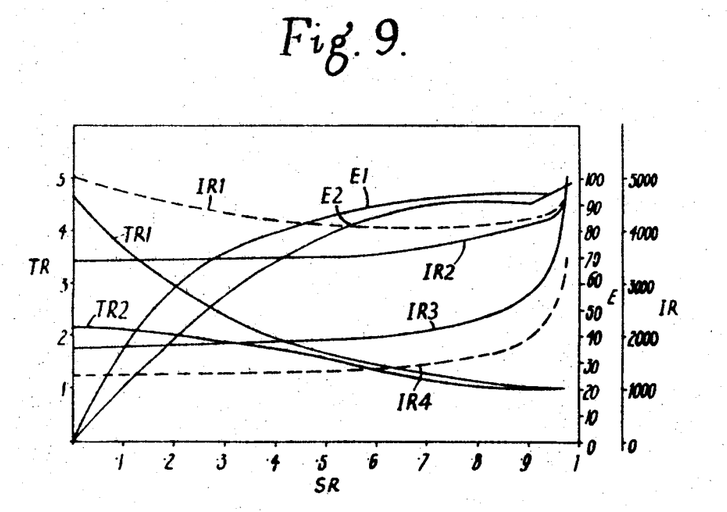
FIG. 9 are speed and efficiency curves.

Variation of the angle of the blades of the circulatory turbine of the present invention provides wide variation in input r.p.m. and power at a given input torque as shown in FIG. 9. Input engine power may be utilised as required.

Figure 6:
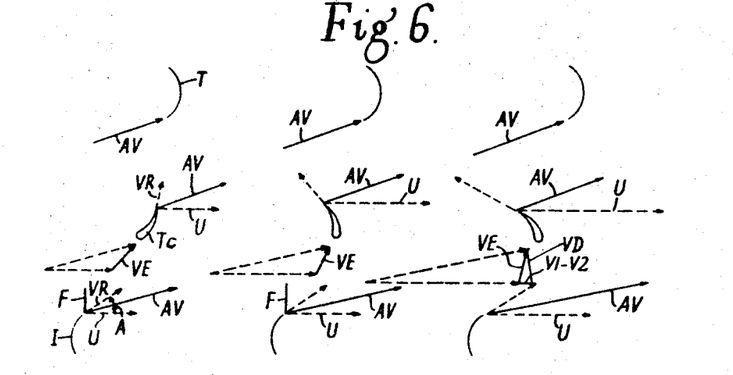
FIGS. 6, 7 and 8 are liquid flow diagrams of a converter-coupling made in accordance with FIG. 1.
Figure 7:
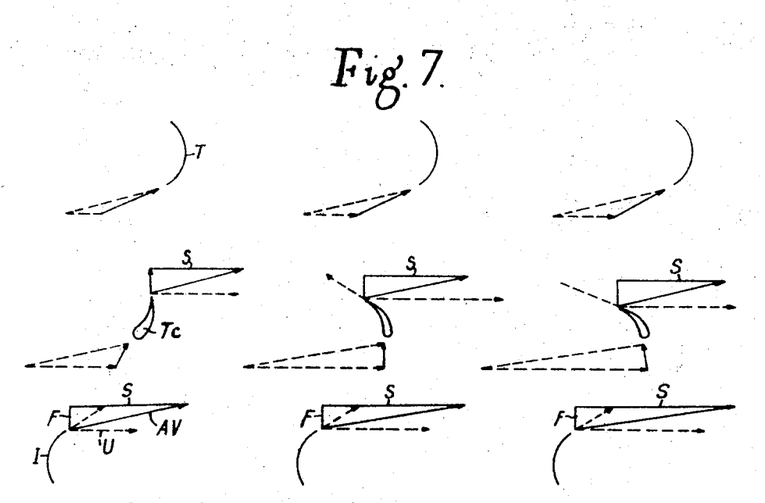
Figure 8:
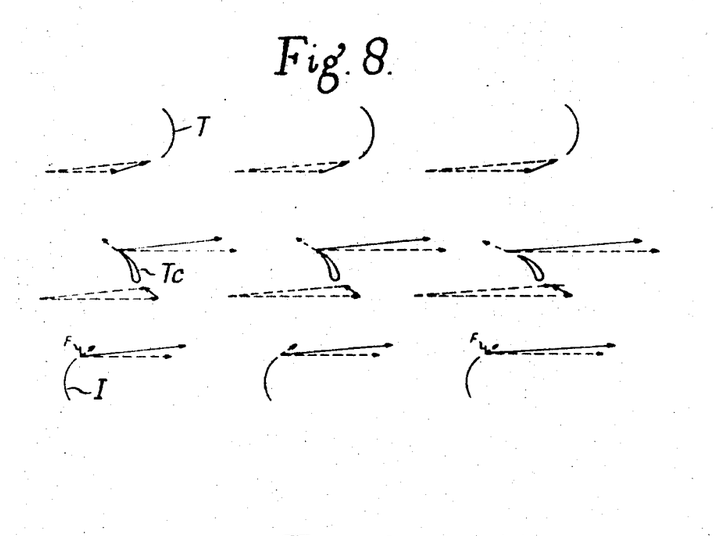

FIGS. 6, 7, and 8 are flow diagrams similar to FIG. 4 but related to a converter-coupling of the present invention and accordingly showing the flow from the impeller, through the circulatory turbine Tc to the output turbine. FIG. 6 shows flow diagrams at stall, FIG. 7 shows the conditions at 0.5 speed ratio and FIG. 8 shows conditions at coupling. In FIG. 6 the left-hand view is at 1750 r.p.m., the centre view at 2800 r.p.m., and the right-hand view at 4000 r.p.m. In FIG. 7 the left-hand view is 1950 r.p.m., the centre view at 3000 r.p.m. and the right-hand view at 3500 r.p.m. The corresponding speeds for FIGS. 4 and 8 are 1450, 1600, 2000 and 2850, 3500 and 4200.

The liquid circulates with the torus flow velocity F (FIG. 7) and leaves the impeller with an absolute velocity AV FIGS. 6 and 7) due to the angle A and the linear velocity U at the blade exit. The tangential component S of the absolute velocity is shown.

It will be observed that the tangential component S at Tc exit, during torque conversion, is considerably smaller than that at impeller I exit. Furthermore if the angles of the blades of Tc are variable, S at Tc exit can be held much more constant than S at impeller exit. The impeller I and the turbine Tc together comprise an impeller and reaction system and as the S at exit can be held fairly constant at widely different speeds, the engine can be run at widely different speeds with little or no variation in engine torque. The power input can be varied at will.

As is well known, the input torque to a torque converter of usual design, varies as the input r.p.m. squared and the value of circulatory flow F as input r.p.m.

It will be observed also that the angles of the blades of the members remain remarkably compatible i.e. the angles of the blades and the angles of the directions of the incoming liquid are not widely different over a wide range of speed ratios and input speeds, i.e. there is little shock loss, caused by an instantaneous change in velocity as illustrated in FIG. 4.

It will also be observed that the circulatory flow F may vary but little with variation in input r.p.m. and input power. As the value of F does not increase, together with the corresponding losses, with increase in input power as in known apparatus, much greater efficiencies are obtainable. It can also be seen that if the angles of the blades of the circulatory turbine Tc are not variable, increased input speeds over the torque converting range are obtainable. This results in increased efficiencies and more constant input speeds.

A fixed blade circulatory turbine with a variable blade reactor may be used to advantage.

The torque developed by Tc results from the difference in S at impeller exit and S at Tc exit.

Any torque on Tc results in reaction and torque conversion and it will be observed that this can occur at much higher speeds and at closer speed ratios than hitherto obtainable.

It is of course within the scope of the invention to gear an element Tc to the impeller, the third member of the gearing connecting other than a fixed part, e.g. an output part.

By including the additional stationary reactor as in FIG. 2, total reaction is substantial thereby providing the wide torque range as shown in FIG. 9. In FIG. 9 TR is torque ratio, SR is speed ratio, E is efficiency, IR is input r.p.m., IR1 is r.p.m. maximum, IR2 is r.p.m. at an intermediate speed, IR3 is r.p.m. minimum at full throttle, IR4 is r.p.m. at half throttle, E1 is efficiency at high input speeds, E2 is efficiency at low input speeds, TR1 is torque ratio at high input speeds, and TR2 is torque ratio at low input speeds. If a variable blade angle reactor is used as above described, shock loss within the entire converter is largely eliminated, an effect hitherto not approached.

In known converters reaction will cease when the tangential velocity at the turbine exit approaches that at the reactor exit. This normally occurs at relatively low speeds due to the increasing linear velocity of the turbine blades at exit, see FIG. 4.

Figure 10:
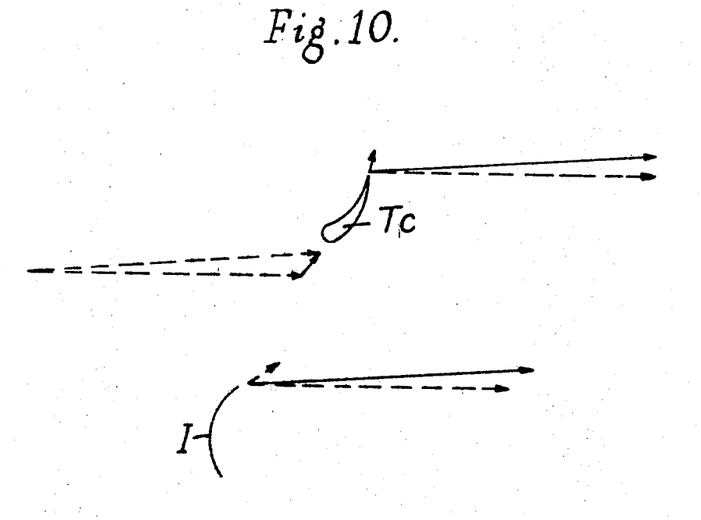
FIG. 10 is another flow diagram of a converter-coupling made in accordance with FIG. 2 during coupling operation.

The present invention may produce reaction over a wide range of speeds and at closer speed ratios with corresponding increases in efficiencies, see FIG. 8. When reaction ceases and the so-called coupling point is reached, the circulatory turbine may under-run because of the freewheel and the flow may be as illustrated in FIG. 10. In the view of FIG. 10 the speed is 4200 r.p.m., with Tc under-running.

Figure 11:
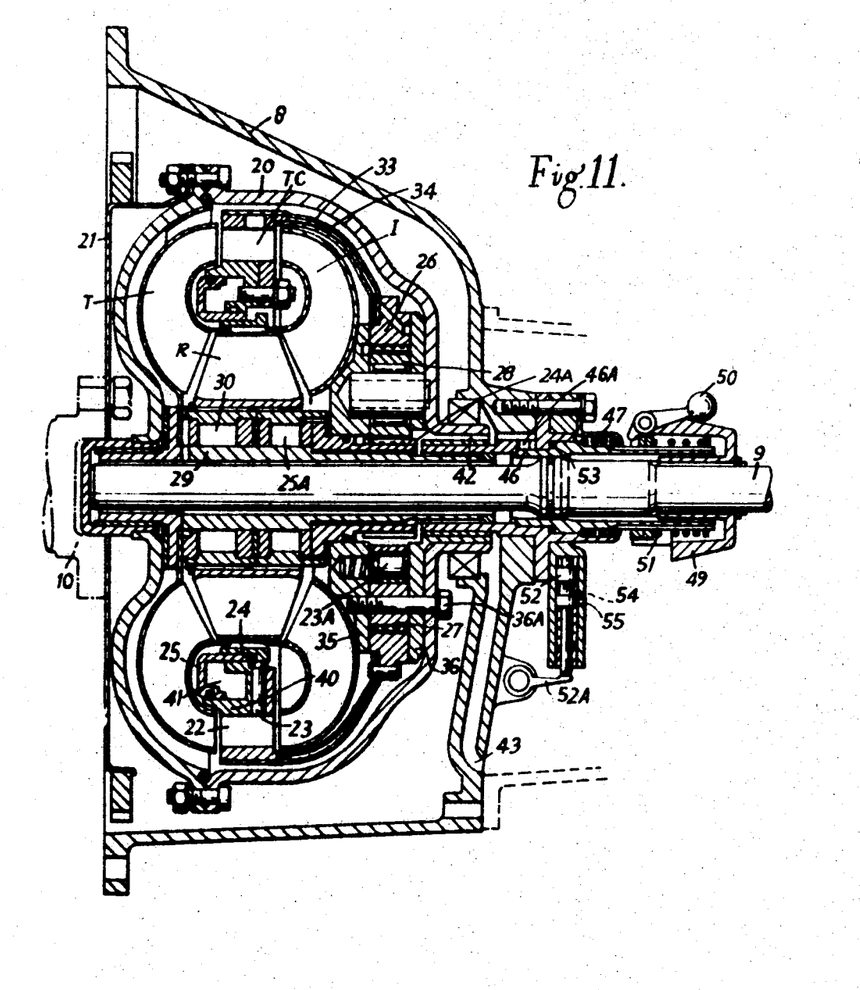
FIG. 11 is a sectional view of a converter-coupling made in accordance with the invention.
Figure 12:
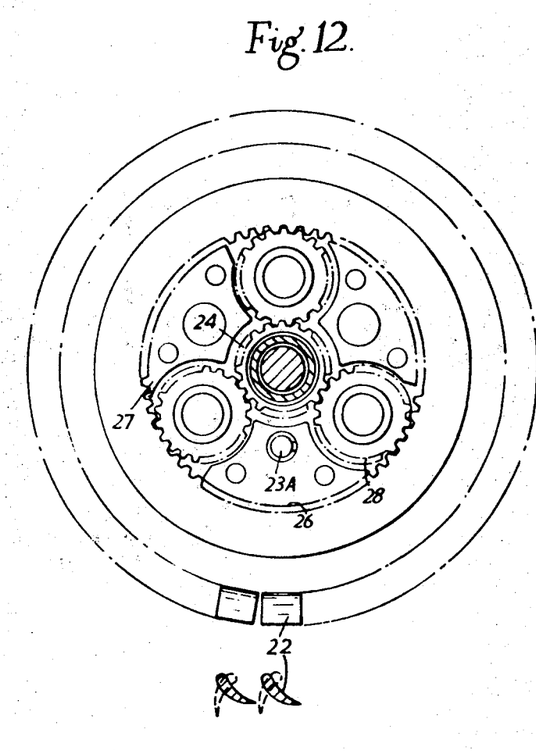
FIG. 12 is an end view of the gearing shown in FIG. 11.
Figure 13:
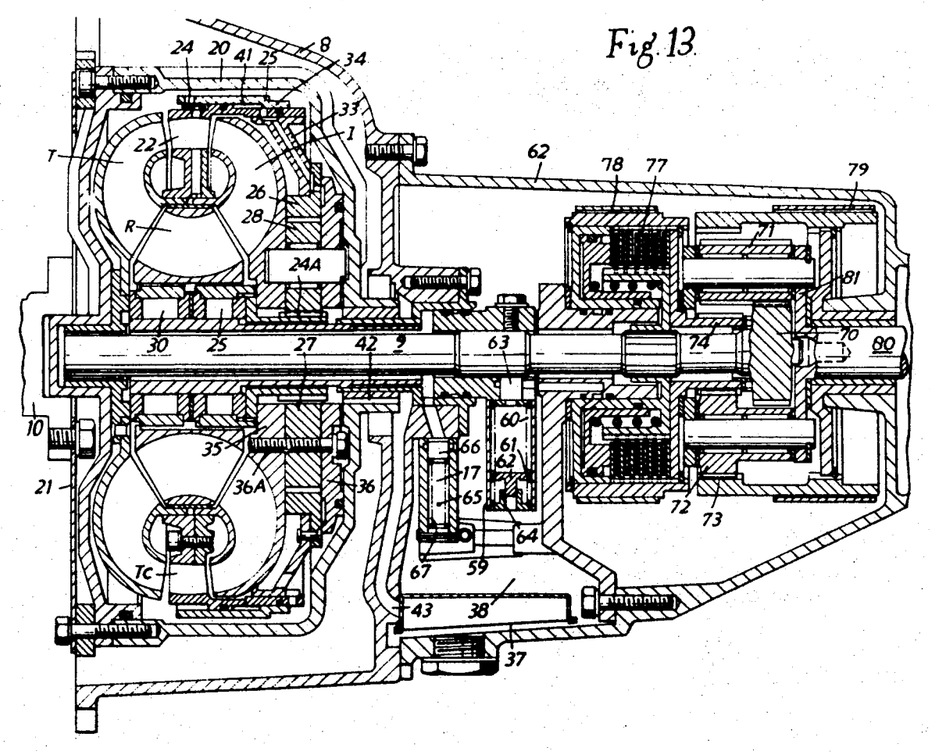
FIG. 13 is a sectional view of another form of converter-coupling made in accordance with the invention.

Referring to FIGS. 11 and 12:

An input shaft 10 drives the shell 20 of the converter through plate 21. The shell drives the impeller I. The circulatory turbine Tc has blades 22 pivoted on spindles 23. The spindles 23 carry cranks 24 which connect with piston 25. The surfaces enclosing the inner and outer sides of the blades may be spherical as shown in FIG. 13. Members 33, 34 connect the element Tc to a ring gear 26. A gear cage 27 connects the shell 20 to the impeller I and has side plates 35, 36 which together enclose ring gear 26 and pinions 28 to form a charging pump. A sunwheel 24A reacts on a fixed tube 29 through a freewheel 25A. The plates 35, 36 are fixed to the shell 20 by bolts 36A. The turbine T is carried by the output shaft 9 and the reactor R reacts on the fixed tube 29 through a freewheel 30. The parts are located within and carried by a casing 8.

Whenever the input shaft 10 rotates and drives the impeller I the turbine Tc rotates at an increased speed.

The piston 25 embraces a part 40 carried by the members 33, 34 to form a space 41.

Pressure within the converter shell 20 tends to move piston 25 in one direction and pressure in the space 41 tends to move it in the other direction. The pressure in the space 41 may be controlled by a pressure regulating valve 23A.

The charging pump has inlets 42 formed at an angle to assist entry and suction 43 having a strainer in a pump (similar to 37, 38 in FIG. 13).

Pressure in the converter is controlled by a valve 46, which controls an exhaust port 46A. A governor 49, 50 is driven by the output shaft 9 and serves to reduce converter charging pressure with increase in the speed of output shaft 9. The mechanical governor 49, 50 acts to increase load on a spring 51 which acts to open the valve 46. Spring 47 acts to close the valve.

A valve 52 is actuated by the input engine throttle pedal and/or a manually operated lever connected to lever 52A, and varies the pressure in space 53 according to the position of the pedal. Pressure acting in the space 53, acts to open valve 46 and exhaust 46A, thereby reducing charging pressure in the converter. Variation of pressure in space 53 by means of valve 52, causes the pressure in the converter to be varied. The valve 52 has a restricted inlet 54 and a restricted outlet 55. It provides maximum pressure when the inlet is fully opened and the outlet fully closed and minimum pressure (zero) when the inlet is fully closed and the outlet fully opened. Intermediate pressures are provided in intermediate positions.

The apparatus shown in FIG. 13 includes a two speed and reverse clutch/brake gearing. In FIG. 13 a tube 59 carries springs 60, 61 and weight 62. When the output shaft 9 is stationary the full load from the springs act on relief valve 63 which connects to the liquid supply through a restricted passage but with increases in speed the centrifugal force acting on the springs and on the weight 62 reduce the spring load acting on valve 63. At moderate speeds the weight presses on an abutment 64 holding spring 61 out of action and at higher speeds the outer coils of spring 60 become solid. In this way the effective spring becomes shorter with increases in speed and pressure maintained by valve 63 less.

This pressure is led through hole 65 to the outer end of a valve 66, the inner end of which regulates the charging pressure. A spring 67 acts on valve 66. The output shaft 9 from the converter carries a sungear 70 which meshes with pinions 71. These pinions mesh with pinions 72 which mesh with a ring gear 73 and a sungear 74. The sungear 74 can be engaged with shaft 9 by clutch 77 for direct drive or held by brake 78 for indirect ratio. Engagement of a brake 79 provides reverse. An output shaft 80 from the gearing is attached to a gear-train carrier 81. The clutch and the brake are engaged by liquid pressure in the known manner and a valve is provided to direct pressure to or exhaust from the devices to select the two speeds, reverse and neutral. Brake 78 may be largely self-engaging and clutch 77 of large capacity so as to operate with low liquid pressure. The selector valve may be operated manually in known manner. Alternatively the two ratios may be changed automatically also in known manner.

Figure 14:
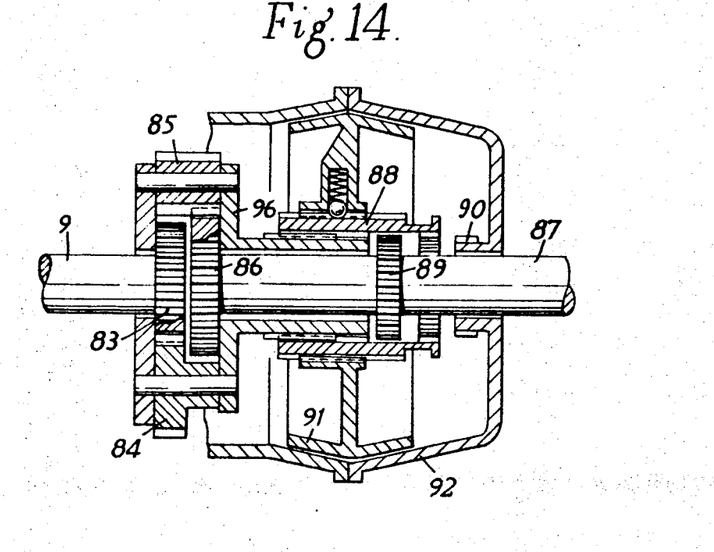
FIGS. 14 and 15 illustrate modifications to be described.

The two-speed and reverse gear may be replaced by a simple mechanical reversing gear as shown in FIG. 14. The output shaft 9 carries a sungear 83 which meshes with pinions 84 which in turn mesh with pinions 85 and which mesh with sungear 86 carried by the output shaft 87. The carrier 96 has a sliding dog-clutch member 88 which can engage teeth 89 for forward running and teeth 90 for reverse running. The friction cones 91 engage the casing 92 to bring rotating parts to rest before engagement of the dog-clutch teeth. The member 88 may carry additional teeth, suitably formed, to engage a fixed part to provide a parking lock.

The charging pump which is normally immersed in liquid will discharge directly into the interior of the converter. One pinion of the pump may act independently at least when the charging pressure is low and provide pressure for space 41 which pressure may be controlled by a pressure regulating valve 23A see FIG. 11.

Figure 15:
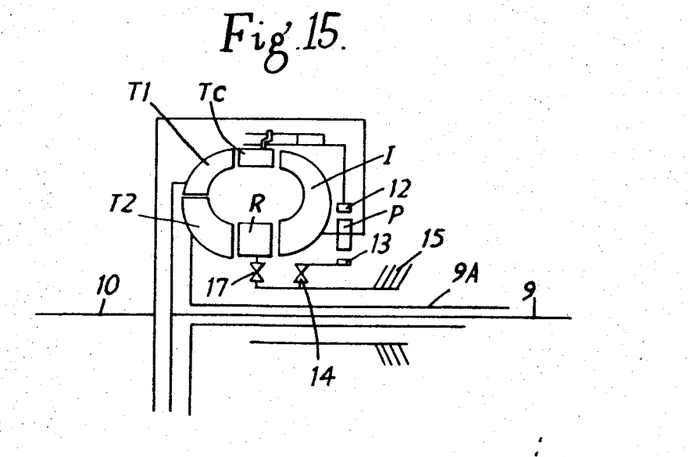

FIG. 15 illustrates an apparatus with two output shafts 9 and 9A. Such a device can be applied to a four-wheel drive motor vehicle, the outer shaft driving the front wheels and the inner the rear wheels. The output torque can be divided as required by the split turbine $T_1$, $T_2$. The torque is automatically reduced on wheel slip, i.e. the torque on shafts 9 and 9A will vary should all or one pair of road wheels slip.

In the operation of converter-couplings of this invention, the input shaft rotates and the pump or impeller I rotates and liquid circulates as shown at F in FIG. 2. Liquid leaving the impeller drives the circulatory turbine Tc and the charging pump maintains a pressure in the converter and a lower pressure in space 41. Torque load on the blades 22 (FIGS. 11 and 13) tends to move the blades to a low torque angle as does pressure in space 41. It should be observed that space 41 and the liquid in it rotate at higher speeds than the surrounding liquid contained by parts of the impeller. This results in greater centrifugal pressure in the space than in surrounding liquid and tends to provide automatic movement of the blades to lower torque positions at increased rotary speeds. Charging pressure within the converter tends to move the blades to a high torque angle, i.e. that which directs the liquid in a backwards manner thereby reducing the tangential velocity to exit, see right hand side of FIG. 6. The circulating liquid passes through the turbine T and the reactor R and enters the impeller I.

With the blades 22 in the minimum torque position, the circulatory turbine is relatively ineffective and the converter characteristics are much as shown in curves A FIG. 5.

With the blades in the maximum torque position, considerable driving torque is applied to the impeller through the gearing in addition to that from the input engine, i.e. power circulation, and input speeds can be greatly increased.

The torque load on the blades 22 will, of course, reduce with increase in the speed of the output shaft 9 and with the reduction in torque and speed ratio. The governor driven by the output shaft reduces the charging pressure with increased speeds with the object of balancing the torque loads over the range. This pressure variation is suitable for charging the converter and relieves the pump of unnecessary pressure and power loss over the higher speed part of the range.

The valve 52 may be actuated over a range at which the input engine remains at full throttle. This gives further variation in the charging pressure so that the blades 22 may be moved to positions between maximum and minimum torque positions thereby providing variable and desired input r.p.m. and power transmission. Different positions of the valve provide different pressures in space 53 or 17 which result in different charging pressures.

The valve 66, FIG. 13, with no pressure on the outer end maintains minimum charging pressure in accordance with load on spring 67. Maximum pressure will be provided when pressure at valve 63 is maximum, i.e. when shaft 9 is stationary, and this pressure is led to space 17. Pressure in space 17 can however vary between zero and maximum according to the position of valve 52 as well as in accordance with the speed of shaft 9. The pressure in space 41 may be maintained constant and somewhat greater than the minimum charging pressure. During coupling when the charging pressures are low, there is no torque reaction and the circulatory turbine may underrun, there will however be some torque on it to drive the pump but the effective speed of the pump will be reduced.

During operation at the high speed end of the range, the reactor R will freewheel in the well known manner, reaction will however still take place at much higher than usual speed at the sunwheel 24.

When a change in the gearing ratio of the apparatus shown in FIG. 13 is made the converter will also change ratio and controls may be arranged to provide smooth infinitely variable action over a wide torque range, e.g. 8:1 to 8:1.

I claim:

1. A hydro-kinetic torque converter-coupling comprising an input member, an output member, an impeller for impelling liquid in the converter-coupling, said impeller being connected to the input member, an output turbine connected to the output member, a secondary turbine adjacent the impeller exit and arranged to be driven by the liquid from the impeller, a gearing between the secondary turbine and the impeller so as to transmit power from the secondary turbine to the impeller and to provide a circulation of power between the secondary turbine and the impeller, said gearing allowing the secondary turbine to rotate with the impeller at a speed ratio other than unity, both the secondary turbine and the output turbine being driven by the liquid momentum imparted by the impeller.

2. A converter-coupling as claimed in claim 1 in which the gearing comprises a toothed planetary gear train.

3. A converter-coupling as claimed in claim 1 wherein the gearing comprises a ring gear which is drivably connected with the secondary turbine, a pinion carrier (35, 36) which is connected with both the impeller and the input shaft, a sunwheel, and pinions carried by said carrier and meshing with the ring gear and sunwheel.

4. A converter-coupling as claimed in claim 1 in which the gearing comprises a ring gear which is drivably connected with the secondary turbine, a pinion carrier (35, 36) which is connected with both the impeller and the input shaft, a sunwheel, and pinions carried by said carrier and meshing with the ring gear and sunwheel, and having a free wheel device connecting the sunwheel to the fixed part and so arranged as to transmit torque in a direction opposite to that of the direction of rotation of the impeller.

5. A converter-coupling as claimed in claim 1 in which the blades of the secondary turbine are pivoted and means are provided for moving them to different operating angles.

6. A converter-coupling as claimed in claim 1 in which the blades of the secondary turbine are pivoted and means are provided for moving them to different operating angles, and having means whereby load acts on said blades tending to move them to the low torque position and means whereby the converter charging liquid pressure urges the blades to the high torque position.

7. A converter-coupling as claimed in claim 1 in which the blades of the secondary turbine are pivoted and means are provided for moving them to different operating angles, and having means whereby load acts on said blades tending to move them to the low torque position and means whereby the converter charging liquid pressure urges the blades to the high torque position, and having governor mechanism driven by the output turbine to vary the charging pressure.

8. A converter-coupling as claimed in claim 1 in which the blades of the secondary turbine are pivoted and means are provided for moving them to different operating angles, and having means whereby load acts on said blades tending to move them to the low torque position and means whereby the converter charging liquid pressure urges the blades to the high torque position, and having governor mechanism driven by the output turbine to vary the charging pressure, and having a manually controlled pressure regulator to vary the charging pressure.

9. A converter-coupling as claimed in claim 1 having the gearing partially or wholly enclosed so as to act also as the charging pump.

10. A converter-coupling as claimed in claim 1 having a bladed reactor element.

11. A converter-coupling as claimed in claim 1 having a bladed reactor element and wherein the reactor element has pivoted blades to permit variation of the operating angles of the blades.

12. A converter-coupling as claimed in claim 1 having at least two output turbine elements.

References Cited

UNITED STATES PATENTS

| 2,969,694 | 1/1961 | Harmon et al. | 74—677 |
| 2,987,940 | 6/1961 | Tuck et al. | 74—677 |

EDGAR W. GEOGHEGAN, Primary Examiner

U.S. Cl. X.R.

74—677